Feb. 2, 1937. D. A. FINLEY 2,069,702
SPRAYER TANK DEVICE
Filed Aug. 2, 1935 2 Sheets-Sheet 1

Inventor
D. A. Finley
By C A Snow & Co.
Attorneys

Feb. 2, 1937. D. A. FINLEY 2,069,702
SPRAYER TANK DEVICE
Filed Aug. 2, 1935 2 Sheets-Sheet 2

Inventor
D. A. Finley
By C. A. Snow & Co.
Attorneys

Patented Feb. 2, 1937

2,069,702

UNITED STATES PATENT OFFICE 2,069,702

SPRAYER TANK DEVICE

Doctor Andrew Finley, Valdosta, Ga.

Application August 2, 1935, Serial No. 34,467

1 Claim. (Cl. 137—21)

This invention relates to spraying machines designed for use in spraying growing crops, such as tobacco, cotton or similar vegetation.

An important object of the invention is to provide a sprayer of the power type, the pump thereof being operated by the rotary movement of the wheels and axle of the machine, as the machine is being moved along over the ground surface. A still further object of the invention is to provide a device of this character wherein the pump is of the rotary type, eliminating the use of rubber or leather washers commonly employed with piston pumps, and which deteriorate due to the action of the chemicals and acids used in the manufacture of spraying material.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
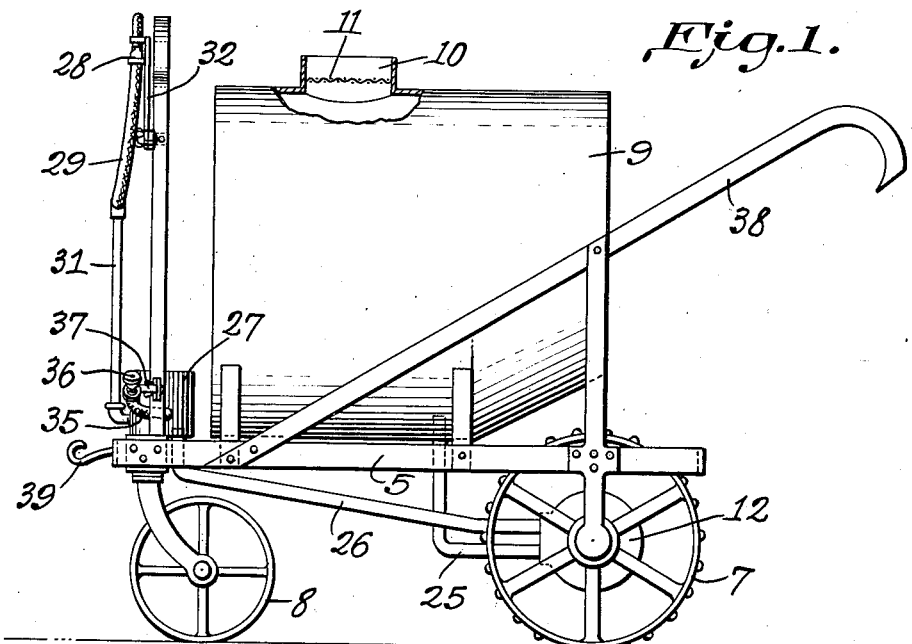
Figure 1 is a side elevational view of a spraying device constructed in accordance with the invention.
Figure 2:
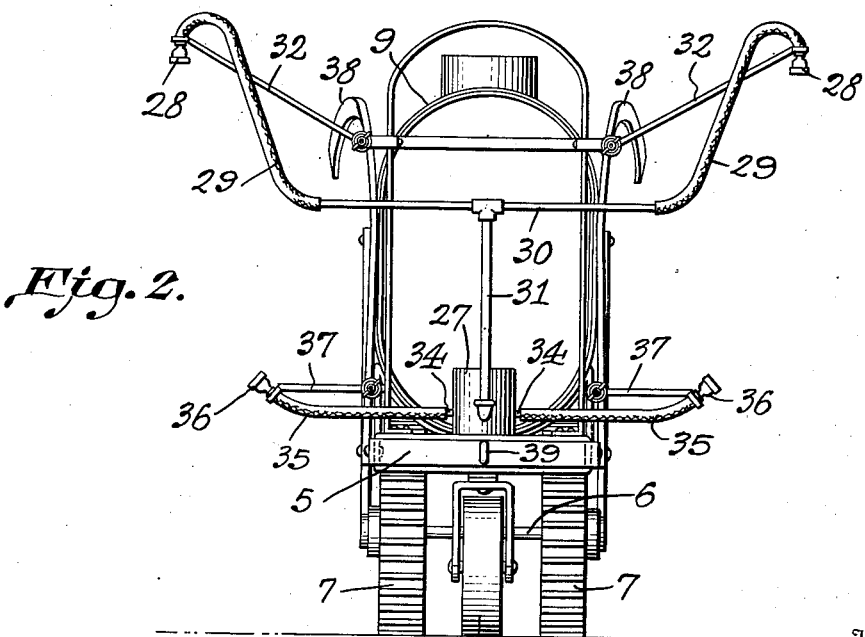
Figure 2 is a front elevational view thereof.

Referring to the drawings in detail, the machine comprises a body portion or platform 5 supported at the rear, by means of the axle 6 and wheels 7, the wheels being secured to the axle so that rotary movement of the wheels will produce a rotary movement of the axle.

The front end of the body portion is supported by the wheel 8 which is mounted intermediate the side edges of the body portion and constructed to pivot freely, so that the machine may be readily guided.

Mounted on the body portion 5 is a supply tank 9 formed with an opening 10 which is guarded by the screen 11, the opening 10 providing the filling opening for the tank whereby the material to be sprayed may be poured into the tank.

The tank 9 may be of any desired construction, however in the present showing the construction of the tank is substantially oval, the bottom of the tank at the rear end thereof being inclined upwardly so that the material contained in the tank, will be directed towards the bottom thereof.

The reference character 12 designates the pump housing of the machine, which is concentrically mounted on the axle 6, the pump housing having a discharge opening 13, and an inlet opening 14. Secured to the axle 6 and eccentrically mounted thereon, is the rotor of the pump, indicated by the reference character 15, and as shown this rotor is of a novel construction so that the pivoted blades carried thereby will not only act to draw the material into the pump housing and force the material from the pump housing but will also act as a valve to insure the operation of the pump, and prevent the material drawn into the pump, from being forced or returned to the supply tank, through the inlet opening of the pump.

Figure 3:
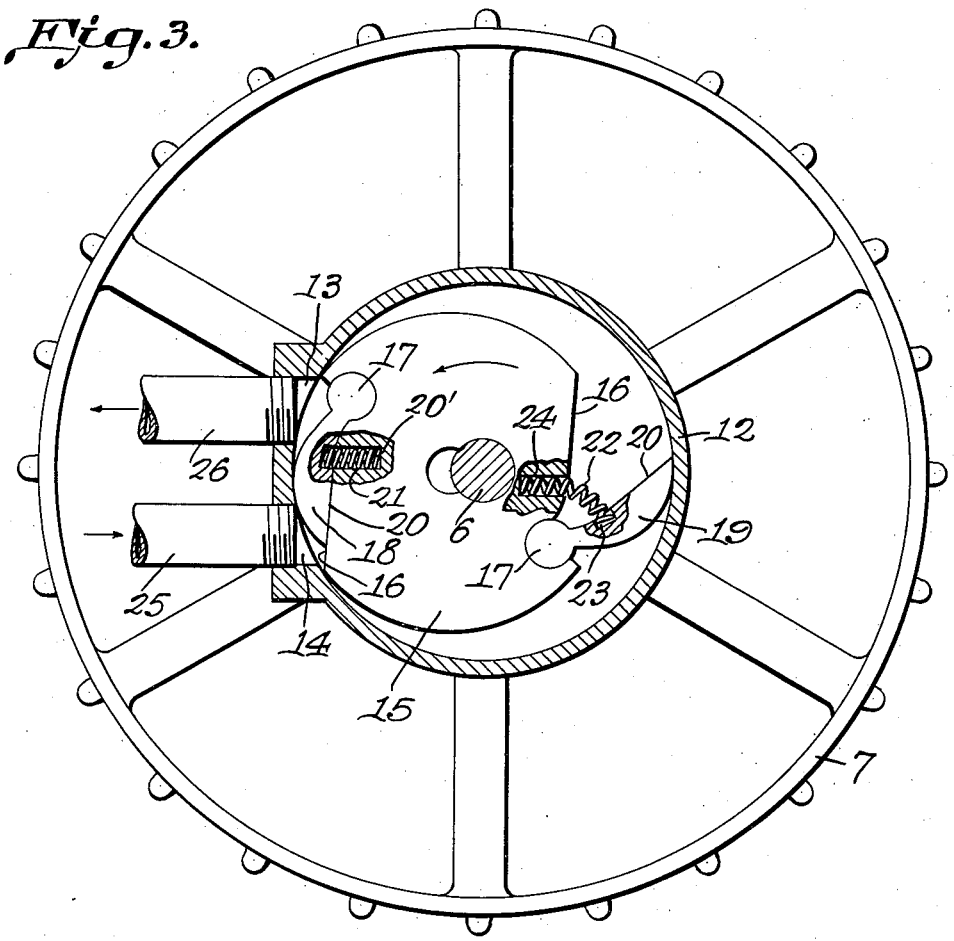
Figure 3 is a sectional view through the pump, illustrating the pump as mounted on the axle of the machine.

As clearly shown by Figure 3 of the drawings, the rotor 15 has opposite sides thereof cut-away as at 16 and formed with curved bearing surfaces accommodating the heads 17 of the blades 18 and 19. These blades have flat inner surfaces 20 adapted to move into engagement with the flat surfaces 16 of the cut-away portions, to the end that the blades will lie in close engagement with the rotor at certain points in the cycles of rotation of the rotor.

The blade 18 is formed with a recess in which one end of the coiled spring 20 is positioned, the opposite end of the coiled spring being held in the recess 21 formed in the rotor directly opposite to the opening of the blade. This coiled spring acts to urge the blade 18 into engagement with the inner surface of the pump housing at all times insuring a fluid tight connection between the blade 18 and pump housing.

The blade 19 which is of a width equal to the width of the pump housing, acts as a piston, the blade 19 being held in an extended position at all times, by means of the coiled spring 22 which has one of its ends seated in the recess 23 of the blade 19, while the opposite end thereof is seated in the recess 24 of the rotor. Thus it will be seen that as the rotor rotates within the pump housing, the blade will, in passing the inlet opening 14, draw material into the pump housing, and forces this material through the discharge opening 13. This pumping action of course will be continuous, as long as the machine is moving over the ground surface.

The inlet pipe of the machine, which is indicated by the reference character 25, extends into the supply tank 9 and connects with the pump housing through the inlet opening 14. The discharge pipe which is indicated by the reference character 26, connects with the pump housing through the discharge opening 13, and extends forwardly where it connects with the pressure tank 27 mounted at the forward end of the body portion, directly in front of the supply tank 9. This pressure tank supplies the spraying material to the nozzle 28, through the rubber tubing 29, which connect with the ends of the pipe 30 carried at the upper end of the vertical pipe 31 that has its lower end connected with the pressure tank, to receive material therefrom. Adjustable arms 32 connect with the spray nozzle 28 which have been designed to spray the upper portions of the plants under treatment, whereby the arms may be adjusted to their proper positions.

Pipes 23 extend laterally from the pressure tank 27 and provide means whereby the flexible tubing 35 may be connected with the pressure tank. The outer ends of the tubing 35 carry spray nozzles 36 which can be directed upwardly to spray the under portions of the plants. Adjustable arms 37 support the nozzles 36, and may be moved to their porper working positions, according to the height of the plant being treated.

The machine is guided by means of handles 38, which are connected to the body portion in such a way that when the handles are moved laterally, lateral pressure is directed to the front end of the body portion making it exceptionally easy for the operator to steer or guide the machine.

A suitable power means may be attached to the machine by means of the hook 39, which extends forwardly from the front end of the body portion.

Figure 4:
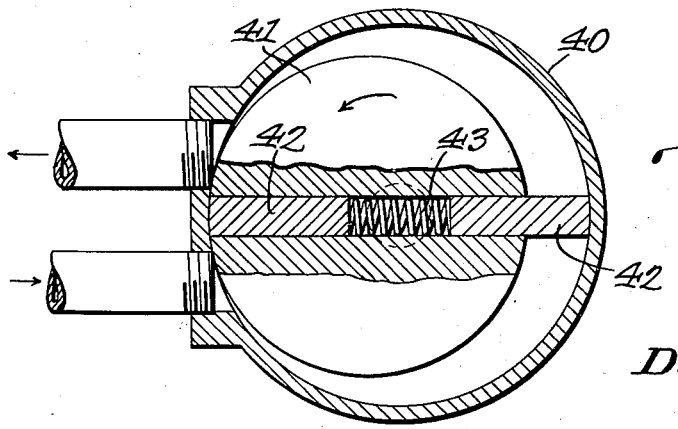
Figure 4 is a sectional view through a modified form of the pump.

In the form of the pump as shown by Figure 4 of the drawings, the pump housing is indicated by the reference character 40, and the rotor is indicated by the reference character 41, the rotor being eccentrically mounted on the axle of the machine. The rotor is formed with a cutout portion extending transversely therethrough, which cutout portion provides a guideway for the blades 42 which operate therein, the blades 42 having their inner ends abutting the coiled spring 43 to the end that the spring 43 will act to urge the blades 42 outwardly into close engagement with the inner surface or wall of the pump housing, thereby insuring a fluid tight connection between the blades and pump housing at all times.

From the foregoing it will be seen that when the machine is moved along rows of growing plants, the pump will be operated, drawing in material to be sprayed, and forcing the material into the pressure tank, from where the material is forced through the spray nozzles to accomplish the purpose of the invention.

Due to the construction of the pump, rubber or fiber cups and washers have been eliminated, and because of the fact that the blades are constantly moving over the wall of the pump housing, the blades will wear in, insuring a fluid tight connection rather than a leaky connection, which is common when the usual piston pump is used for spraying purposes.

Having thus described the invention, what is claimed is:

A sprayer tank device comprising a frame, a tank substantially oval in cross section, mounted on the frame, the bottom of the tank being inclined from one end of the tank to a point near the center of the bottom of the tank, an outlet pipe extending through the bottom of the tank and disposed adjacent to the lower end of the inclined portion of the bottom, so that liquid within the tank will be directed downwardly to the pipe, and the upper end of the pipe terminating slightly above the bottom of the tank.

DOCTOR ANDREW FINLEY.